(12) United States Patent
Sun et al.

(10) Patent No.: US 7,544,723 B2
(45) Date of Patent: Jun. 9, 2009

(54) BLUE PRINTING INK FOR COLOR FILTER APPLICATIONS

(75) Inventors: Lizhong Sun, San Jose, CA (US); Quanyuan Shang, Saratoga, CA (US); John M. White, Hayward, CA (US)

(73) Assignee: Applied Materials, Inc., Santa Clara, CA (US)

( * ) Notice: Subject to any disclaimer, the term of this patent is extended or adjusted under 35 U.S.C. 154(b) by 595 days.

(21) Appl. No.: 11/182,491

(22) Filed: Jul. 15, 2005

(65) Prior Publication Data

US 2007/0014933 A1 Jan. 18, 2007

(51) Int. Cl.
*C09D 11/00* (2006.01)
(52) U.S. Cl. .................................... 523/160; 523/161
(58) Field of Classification Search ................. 523/160, 523/161
See application file for complete search history.

(56) References Cited

U.S. PATENT DOCUMENTS

| | | | |
|---|---|---|---|
| 4,303,924 A | 12/1981 | Young, Jr. | |
| 4,987,043 A | 1/1991 | Roosen et al. | |
| 5,114,760 A | 5/1992 | Takemura et al. | |
| 5,177,627 A | 1/1993 | Ishiwata et al. | |
| 5,232,634 A | 8/1993 | Sawada et al. | |
| 5,232,781 A | 8/1993 | Takemura et al. | |
| 5,264,952 A | 11/1993 | Fukutani et al. | |
| 5,340,619 A | 8/1994 | Chen et al. | |
| 5,399,450 A | 3/1995 | Matsushima et al. | |
| 5,432,538 A | 7/1995 | Carlotta | |
| 5,552,192 A | 9/1996 | Kashiwazaki et al. | |
| 5,554,466 A | 9/1996 | Matsushima et al. | |
| 5,593,757 A | 1/1997 | Kashiwazaki et al. | |
| 5,626,994 A | 5/1997 | Takayanagi et al. | |
| 5,648,198 A | 7/1997 | Shibata | |
| 5,702,776 A | 12/1997 | Hayase et al. | |
| 5,705,302 A | 1/1998 | Ohno et al. | |
| 5,714,195 A | 2/1998 | Shiba et al. | |
| 5,716,739 A | 2/1998 | Kashiwazaki et al. | |
| 5,716,740 A | 2/1998 | Shiba et al. | |
| 5,721,076 A | 2/1998 | Watanabe et al. | |
| 5,726,724 A | 3/1998 | Shirota et al. | |
| 5,748,266 A | 5/1998 | Kodate | |
| 5,811,209 A | 9/1998 | Eida et al. | |
| 5,817,441 A | 10/1998 | Iwata et al. | |
| 5,831,704 A | 11/1998 | Yamada et al. | |
| 5,847,735 A | 12/1998 | Betschon | |
| 5,880,799 A | 3/1999 | Inoue et al. | |
| 5,895,692 A | 4/1999 | Shirasaki et al. | |
| 5,916,713 A | 6/1999 | Ochiai et al. | |
| 5,916,735 A | 6/1999 | Nakashima et al. | |
| 5,922,401 A | 7/1999 | Kashiwazaki et al. | |
| 5,948,576 A | 9/1999 | Shirota et al. | |
| 5,948,577 A | 9/1999 | Nakazawa et al. | |
| 5,956,063 A | 9/1999 | Yokoi et al. | |
| 5,962,581 A | 10/1999 | Hayase et al. | |
| 5,968,688 A | 10/1999 | Masuda et al. | |
| 5,969,780 A | 10/1999 | Matsumoto et al. | |
| 5,984,470 A | 11/1999 | Sakino et al. | |
| 5,989,757 A | 11/1999 | Satoi | |
| 6,001,444 A | 12/1999 | Koide et al. | |
| 6,013,415 A | 1/2000 | Sakurai et al. | |
| 6,025,898 A | 2/2000 | Kashiwazaki et al. | |
| 6,025,899 A | 2/2000 | Fukunaga et al. | |
| 6,042,974 A | 3/2000 | Iwata et al. | |
| 6,063,174 A | 5/2000 | Shirota et al. | |
| 6,063,527 A | 5/2000 | Nishikawa et al. | |
| 6,066,357 A | 5/2000 | Tang et al. | |
| 6,071,989 A | 6/2000 | Sieber et al. | |
| 6,078,377 A | 6/2000 | Tomono et al. | |
| 6,084,006 A | 7/2000 | Kashiwazaki et al. | |
| 6,087,196 A | 7/2000 | Sturm et al. | |
| 6,134,059 A | 10/2000 | Shirota et al. | |
| 6,140,988 A | 10/2000 | Yamada | |
| 6,142,604 A | 11/2000 | Kanda et al. | |
| 6,145,981 A | 11/2000 | Akahira et al. | |
| 6,149,257 A | 11/2000 | Yanaka et al. | |
| 6,154,227 A | 11/2000 | Lund | |
| 6,158,858 A | 12/2000 | Fujiike et al. | |
| 6,162,569 A | 12/2000 | Nakashima et al. | |
| 6,183,917 B1 | 2/2001 | Sakamoto et al. | |
| 6,196,663 B1 | 3/2001 | Wetchler et al. | |
| 6,211,347 B1 | 4/2001 | Sieber et al. | |
| 6,224,205 B1 | 5/2001 | Akahira et al. | |
| 6,226,067 B1 | 5/2001 | Nishiguchi et al. | |
| 6,228,435 B1 | 5/2001 | Yoshikawa et al. | |

(Continued)

FOREIGN PATENT DOCUMENTS

JP 59-075205 4/1984

(Continued)

*Primary Examiner*—Edward J Cain
(74) *Attorney, Agent, or Firm*—Patterson & Sheridan LLP

(57) ABSTRACT

Blue inks for displays are provided. In one aspect, the blue inks include one or more blue organic pigments, one or more monomers, one or more polymeric dispersants, and one or more organic solvents. In another aspect, the blue inks include one or more blue organic pigments, one or more violet pigments, one or more monomers, one or more polymeric dispersants, and one or more organic solvents. Methods of forming displays that include dispensing the blue inks by inkjetting onto a substrate and displays that include the blue inks are also provided.

22 Claims, 2 Drawing Sheets

U.S. PATENT DOCUMENTS

| | | |
|---|---|---|
| 6,234,626 B1 | 5/2001 | Axtell et al. |
| 6,242,139 B1 | 6/2001 | Hedrick et al. |
| 6,244,702 B1 | 6/2001 | Sakino et al. |
| 6,264,322 B1 | 7/2001 | Axtell et al. |
| 6,270,930 B1 | 8/2001 | Okabe |
| 6,271,902 B1 | 8/2001 | Ogura et al. |
| 6,277,529 B1 | 8/2001 | Marumoto et al. |
| 6,281,960 B1 | 8/2001 | Kishimoto et al. |
| 6,300,388 B1 | 10/2001 | Verdonck et al. |
| 6,310,115 B1 | 10/2001 | Vanmaele et al. |
| 6,312,771 B1 | 11/2001 | Kashiwazaki et al. |
| 6,322,936 B1 | 11/2001 | Nishikawa et al. |
| 6,323,921 B1 | 11/2001 | Kurauchi et al. |
| 6,331,384 B1 | 12/2001 | Satoi |
| 6,341,840 B1 | 1/2002 | Van Doorn et al. |
| 6,344,301 B1 | 2/2002 | Akutsu et al. |
| 6,356,357 B1 | 3/2002 | Anderson et al. |
| 6,358,602 B1 | 3/2002 | Horiuchi et al. |
| 6,367,908 B1 | 4/2002 | Serra et al. |
| 6,384,529 B2 | 5/2002 | Tang et al. |
| 6,386,675 B2 | 5/2002 | Wilson et al. |
| 6,392,728 B2 | 5/2002 | Tanaka et al. |
| 6,392,729 B1 | 5/2002 | Izumi et al. |
| 6,399,257 B1 | 6/2002 | Shirota et al. |
| 6,416,174 B1 | 7/2002 | Ito et al. |
| 6,417,908 B2 | 7/2002 | Nishiguchi et al. |
| 6,424,393 B1 | 7/2002 | Hirata et al. |
| 6,424,397 B1 | 7/2002 | Kuo |
| 6,426,166 B2 | 7/2002 | Nishikawa et al. |
| 6,428,135 B1 | 8/2002 | Lubinsky et al. |
| 6,428,151 B1 | 8/2002 | Yi et al. |
| 6,429,916 B1 | 8/2002 | Nakata et al. |
| 6,433,852 B1 | 8/2002 | Sonoda et al. |
| 6,447,877 B1 | 9/2002 | Hegi et al. |
| 6,450,635 B1 | 9/2002 | Okabe et al. |
| 6,455,208 B1 | 9/2002 | Yamashiki et al. |
| 6,462,798 B1 | 10/2002 | Kim et al. |
| 6,464,329 B1 | 10/2002 | Koitabashi et al. |
| 6,464,331 B1 | 10/2002 | Van Doorn et al. |
| 6,468,702 B1 | 10/2002 | Yi et al. |
| 6,475,271 B2 | 11/2002 | Lin |
| 6,476,888 B2 | 11/2002 | Yamanashi |
| 6,480,253 B1 | 11/2002 | Shigeta et al. |
| 6,508,533 B2 | 1/2003 | Tsujimoto et al. |
| 6,553,852 B1 | 4/2003 | Smail et al. |
| 6,557,984 B2 | 5/2003 | Tanaka et al. |
| 6,558,753 B1 | 5/2003 | Ylitalo et al. |
| 6,569,706 B2 | 5/2003 | Pakbaz et al. |
| 6,570,631 B2 | 5/2003 | Ko |
| 6,627,364 B2 | 9/2003 | Kiguchi et al. |
| 6,630,274 B1 | 10/2003 | Kiguchi et al. |
| 6,632,116 B2 | 10/2003 | Watanabe et al. |
| 6,667,795 B2 | 12/2003 | Shigemura |
| 6,686,104 B1 | 2/2004 | Shiba et al. |
| 6,692,983 B1 | 2/2004 | Chen et al. |
| 6,695,905 B2 | 2/2004 | Rozumek et al. |
| 6,698,866 B2 | 3/2004 | Ward et al. |
| 6,705,694 B1 | 3/2004 | Barbour et al. |
| 6,719,442 B1 | 4/2004 | Chen |
| 6,738,113 B2 | 5/2004 | Yu et al. |
| 6,767,090 B2 | 7/2004 | Yatake et al. |
| 6,786,580 B1 | 9/2004 | Gray et al. |
| 6,843,838 B2 | 1/2005 | Zimmer et al. |
| 6,881,251 B2 | 4/2005 | Taniguchi et al. |
| 6,890,378 B2 | 5/2005 | Yatake et al. |
| 2001/0012596 A1 | 8/2001 | Kunimoto et al. |
| 2002/0054197 A1 | 5/2002 | Okada et al. |
| 2002/0081376 A1 | 6/2002 | Yonehara |
| 2002/0128515 A1 | 9/2002 | Ishida et al. |
| 2003/0011989 A1 | 1/2003 | Chan |
| 2003/0025446 A1 | 2/2003 | Lin et al. |
| 2003/0030715 A1 | 2/2003 | Cheng et al. |
| 2003/0048427 A1 | 3/2003 | Fernandez et al. |
| 2003/0117455 A1 | 6/2003 | Bruch et al. |
| 2003/0118921 A1 | 6/2003 | Chen et al. |
| 2003/0152849 A1 | 8/2003 | Chan-Park et al. |
| 2003/0171059 A1 | 9/2003 | Kawase et al. |
| 2003/0179327 A1 | 9/2003 | Nonaka et al. |
| 2003/0189604 A1 | 10/2003 | Bae et al. |
| 2003/0199612 A1 | 10/2003 | Nakajima |
| 2003/0218645 A1 | 11/2003 | Dings et al. |
| 2003/0222927 A1 | 12/2003 | Koyama |
| 2003/0224621 A1 | 12/2003 | Ostergard et al. |
| 2003/0228538 A1 | 12/2003 | Weidman et al. |
| 2003/0231272 A1 | 12/2003 | Nakamura et al. |
| 2004/0008243 A1 | 1/2004 | Sekiya |
| 2004/0018305 A1 | 1/2004 | Pagano et al. |
| 2004/0023425 A1 | 2/2004 | Chen et al. |
| 2004/0023567 A1 | 2/2004 | Koyama et al. |
| 2004/0048950 A1 | 3/2004 | Nishida et al. |
| 2004/0075383 A1 | 4/2004 | Endo et al. |
| 2004/0075789 A1 | 4/2004 | Wang |
| 2004/0086631 A1 | 5/2004 | Han et al. |
| 2004/0094768 A1 | 5/2004 | Yu et al. |
| 2004/0097101 A1 | 5/2004 | Kwong et al. |
| 2004/0125181 A1 | 7/2004 | Nakamura |

FOREIGN PATENT DOCUMENTS

| | | |
|---|---|---|
| JP | 61-245106 | 10/1986 |
| JP | 63-235901 | 9/1988 |
| JP | 63-294503 | 12/1988 |
| JP | 01-277802 | 11/1989 |
| JP | 02-173703 | 7/1990 |
| JP | 02-173704 | 7/1990 |
| JP | 07-198924 | 8/1995 |
| JP | 08-160219 | 6/1996 |
| JP | 2004-077681 | 3/2004 |
| WO | WO 03/009947 A1 | 2/2003 |

…

BLUE PRINTING INK FOR COLOR FILTER APPLICATIONS

BACKGROUND OF THE INVENTION

1. Field of the Invention

Embodiments of the present invention generally relate to flat panel displays and particularly to compositions and methods for forming color filters for use in flat panel displays.

2. Description of the Related Art

Flat panel displays (FPDs) have become the favored display technology for computers, televisions, and personal electronic devices such as cell phones, personal digital assistants, etc. Liquid crystal displays (LCDs) are a preferred type of commercially available FPDs. Different colors are obtained in liquid crystal displays by transmitting light through a color filter located on a substrate of a LCD. The color filter includes pixels, wherein each pixel may include three colors, typically red, green, and blue. Each color of a pixel may be considered a sub-pixel. Typically, each sub-pixel is surrounded by a black matrix material that provides an opaque area between sub-pixels and therefore prevents light leakage in the thin film transistors (TFTs) of the LCD. FIG. 1 is a top view of two adjacent pixels 1 and 2 of a color filter 10. Pixel 1 includes three sub-pixels 3, 4, and 5, and pixel 2 includes three sub-pixels 6, 7, and 8. Black matrix material 9 surrounds and separates each of the sub-pixels 3, 4, 5, 6, 7, and 8. FIG. 2 is a side, cross-sectional view of color filter 10 showing substrate 12 upon which the black matrix material 9 and the pixels 1 and 2 (shown in FIG. 1) are formed. The sub-pixels 3, 4, and 5 are filled with three different colors of ink, 14, 16, and 18, respectively.

Traditional methods of producing color filters, such as dyeing, lithography, and electrodeposition, require the sequential introduction of the three colors. That is, a first set of pixels having one color is produced by a series of steps, whereupon the process must be repeated twice more to apply all three colors. The series of steps involved in this process includes at least one curing phase in which the deposited liquid color agent must be transformed into a solid, permanent form. Thus, such traditional methods of producing color filters can be very time consuming. Traditional color filter production methods also require expensive materials and typically have a low yield, which further increases the cost of producing color filters. Also, as each color agent is processed by a separate line of equipment, equipment costs for such traditional methods are high. In fact, the coast of manufacturing the color filter of a LCD may be as much as 20% of the total cost of manufacturing the LCD.

Methods of using inkjet systems that allow the deposition of all three colors simultaneously and that reduce the cost of manufacturing color filters have been developed. An inkjet system may be used to deposit different colors through different nozzles into sub-pixels created by a patterned black matrix on a substrate.

The development of inkjet systems for manufacturing color filters of LCDs has created a need for inks that can be dispensed by an inkjet without clogging the inkjet, i.e., have good jettability, and that do not degrade during inkjetting. In particular, there is a need for inks that are physically and chemically stable before, during, and after inkjetting and that have a color chromaticity that meets color filter specifications for both computer and television monitors, as well as for other devices containing displays.

SUMMARY OF THE INVENTION

The present invention provides compositions and methods for forming displays for flat panel devices. In one embodiment, a blue ink for forming a display by an inkjet method comprises one or more blue organic pigments, one or more monomers, one or more polymeric dispersants, and one or more organic solvents. The blue ink may further comprise one or more violet pigments.

In a further embodiment, the blue ink comprises one or more blue organic pigments, one or more violet pigments, one or more monomers, one or more polymeric dispersants, one or more organic solvents, and one or more additives selected from the group consisting of a wetting agent, an adhesion promoter, a defoamer, an anti-skinning agent, and combinations thereof, wherein the ratio of the total wt % of the one or more blue organic pigments to the total wt % of the one or more violet organic pigments is between about 30:1 and about 10:1. The blue ink may further comprise one or more oligomers.

In another embodiment, a method of forming a display is provided, the method comprising dispensing a blue ink onto a substrate with an inkjet printing apparatus, wherein the blue ink comprises one or more blue organic pigments, one or more monomers, one or more polymeric dispersants, and one or more organic solvents. The blue ink may also include one or more violet pigments.

In a further embodiment, a display is provided, wherein the display is produced by a process comprising dispensing a blue ink onto a substrate with an inkjet printing apparatus, wherein the blue ink comprises one or more blue organic pigments, one or more monomers, one or more polymeric dispersants, and one or more organic solvents. The blue ink may also include one or more violet pigments.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

The present invention generally provides a blue ink for a flat panel display. For example, the blue ink may be used as part of a color filter for a LCD or to filter color in an organic-light emitting diode (OLED) display. A method of forming a color filter comprising dispensing the blue ink on a substrate is also provided. The blue ink is dispensed by an inkjet printing apparatus.

Figure 1:
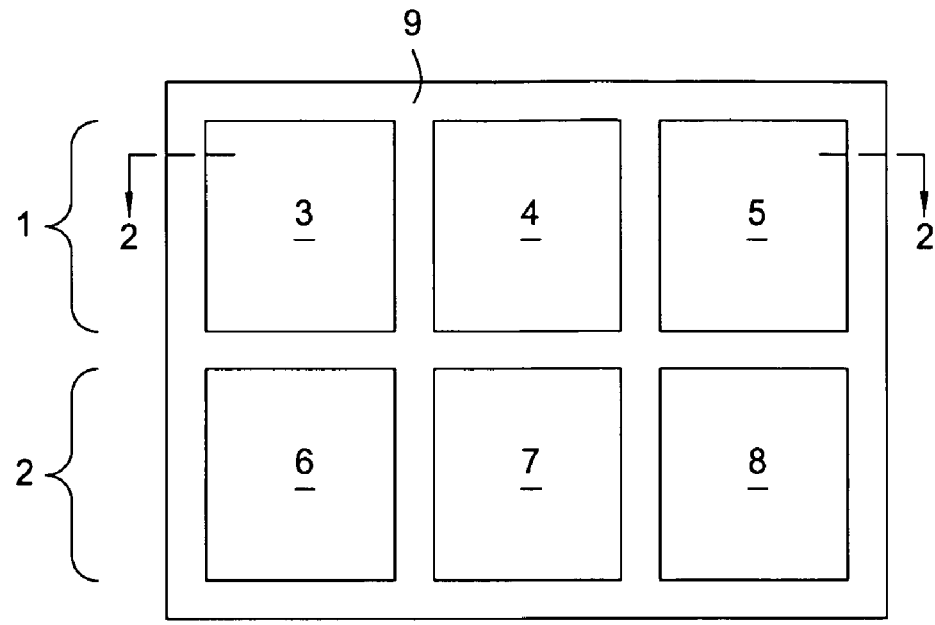
FIG. 1 is a top view of two pixels each containing three sub-pixels according to the prior art.
Figure 2:
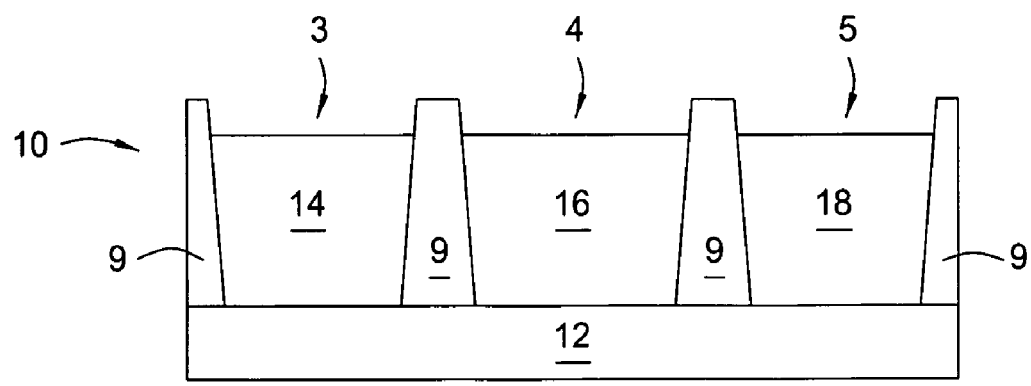
FIG. 2 is a side, cross-sectional view of the pixels of FIG. 1 according to the prior art.

In one embodiment, the substrate on which the ink is dispensed, i.e., the substrate for the color filter, may be any material having a high degree of optical transparency, such as glass. The substrate has a patterned black matrix material thereon, as shown in FIGS. 1 and 2. The black matrix material may be, for example, a black matrix resin or a chromium oxide-based black matrix material that includes a photoresist. Optionally, the substrate may be pre-treated, such as with a surface active compound prior to the deposition of the ink on the substrate to enhance the spread of the ink on the substrate and to enhance the formation of a desired surface profile of the ink on the substrate.

In one embodiment, the blue ink comprises one or more blue organic pigments, one or more monomers, one or more polymeric dispersants, and one or more organic solvents. The blue ink may include less than about 30 wt % of the one or more blue organic pigments, e.g., between about 5 wt % and about 30 wt %, less than about 30 wt % of the one or more monomers, e.g., between about 5 wt % and about 30 wt %, between about 5 wt % and about 15 wt % of the one or more polymeric dispersants, and between about 40 wt % and about 70 wt % of the one or more organic solvents. Optionally, the blue ink may also include one or more oligomers, such as less than about 15 wt % of the one or more oligomers, e.g., between about 1 wt % and about 15 wt % of the one or more oligomers. The blue ink may also include one or more additives. The one or more additives may include a wetting agent, an adhesion promoter, a defoamer, an anti-skinning agent, or combinations thereof. The components of the blue ink and the optional additives will be described in further detail below. The one or more blue pigments, optional one or more oligomers, one or more polymeric dispersants and one or more solvents may be blended and milled at a high speed, such as between about 3000 rpm and about 7000 rpm by using a milling machine, such as a milling machine available from Hockmeyer Equipment Corporation (e.g., an H-2 Disperser, HVR Disperser or HV-HVI Disperser), to form a stable blue nano-particle pigment dispersion. Then, the blue pigment dispersion, the one or more monomers, and the optional additives may be blended together and ultra-sonicated, such as at 120 W for 40 s/100 ml, to form the blue ink, which has a high pigment loading.

The one or more blue organic pigments may be a PB 15:6 (pigment blue number 15:6 according to the Color Index) pigment, e.g., Fastogen Blue EP7S and Fastogen Blue AE-8. The blue organic pigments may have an average particle size of less than 200 nm, such as between about 30 nm and about 200 nm. The total pigment loading (the percent weight of the ink that is provided by the pigment) of the one or more blue organic pigments is less than 30 wt %, such as between about 0.5 wt % and about 30 wt %.

Preferably, the ink also includes one or more violet pigments in addition to the one or more blue organic pigments at a total pigment loading of the one or more blue organic pigments and the one or more violet pigments of less than 30 wt %, such as between about 5 wt % and about 30 wt %. The pigment loading of the one or more violet pigments may be less than about 10 wt %, such as between about 0.5 wt % and about 10 wt %. PV23 is an example of a violet pigment that may be used. Examples of PV23 pigments are Hostaperm Violet P-RL, Hostaperm Violet RL02, Hostaperm Violet RL-NF, Hostaperm Violet BL, Hostaperm Violet GT, Hostaperm Violet GM, Hostaperm Violet GL, Fastogen Super Violet RNS, and Fastogen Super Violet RKVS. In one aspect, the ratio of the amount of blue pigmen(s) to the amount of violet pigment(s) in the ink is between about 30:1 to about 10:1.

It is believed that the combination of blue and violet pigments described herein results in the formation of blue inks that have a desired chromaticity for color filters for TV and computer LCDs. Blue inks having a chromaticity of x=0.130, y=0.070, Y=6.00 to x=0.148, y=0.100, Y=9.80 (wherein x and y are the color coordinates on a CIE chromaticity diagram and Y is a luminance measurement) were obtained according to embodiments of the invention using the combination of blue and violet pigments described herein.

The one or more monomers may be diacrylate esters or acrylic esters, such as 1,6-hexanediol diacrylate, propoxylated neopental glycol diacrylate (2 PO NPGDA), or dipentaerythritol hexacrylate (DPHA). 1,6-hexanediol diacrylate is available from Sartomer Chemical under the name SR238, and DPHA is available from Nippon Kayaku Co., Ltd. The one or more monomers may be a dipentaerythritol pentaacrylate, such as SR399LV. The monomers may be mono-, bi-, or multi-functional.

The one or more oligomers may be aromatic monoacrylate oligomers, aliphatic diacrylate oligomers, aliphatic triacrylate oligomers, or polyester acrylate oligomers. An example of a polyester acrylate oligomer that may be used is CN2279 from Sartomer Chemical. The one or more monomers and the optional one or more oligomers polymerize upon the application of certain types of energy to provide a matrix within which the color pigments are dispersed.

The polymeric dispersants include a polymeric backbone having pigment anchoring groups attached thereto that stabilize the pigment(s) within the ink and minimize the aggregation and settling of the pigment(s). The polymeric dispersants can be polymeric amides, polyesters, polyacrylic acid polymers, acrylic acid/maleic acid copolymers, or combinations thereof. It is believed that the polymeric dispersants improve the color uniformity and physical uniformity of color filters by enhancing the uniform distribution of pigments within the ink. The one or more polymeric dispersants may include Solsperse 34750, Solsperse 5000, or Solsperse 22000, all of which are available from Lubrizol. The one or more polymeric dispersants may also include glycerol mono-oleate, which is available as Capmul® GMO-50 from Abitec Corporation. EFKA® 7496 is a block copolymer that may be used as the polymeric dispersant.

The one or more organic solvents solubilize the other components of the ink to provide a flowable ink that is capable of being dispensed by an inkjet printing apparatus, such as through an inkjet nozzle. The one or more organic solvents also adjust the viscosity and surface tension of the ink. Blue ink according to embodiments of the invention may have a low viscosity, e.g., between about 5 cPs (centipoise) and about 25 cPs, preferably between about 8 cPs and about 20 cPs at 100 rpm and 20.0° C., as measured by a Brookfield DV-III+ Pro Viscometer. Blue ink according to embodiments of the invention may have a surface tension of between about 22 mN/m and about 35 mN/m, preferably between about 25 mN/m and about 30 mN/m, at 20.0° C., as measured by AquaPi, a surface tension measurement tool from Kibron, Inc. The one or more solvents may be acetates, such as methyl proxitol acetate (MPA), propylene glycol diacetate, butyl acetate, 3-methoxybutyl acetate, methoxy propanolacetate, or propyleneglycol monomethylether acetate, propionates, such as n-amyl propionate or ethyoxyethylpropionate, alcohols, such as butanol, ketones, such as methyl n-amyl ketone (2-heptanone), or combinations thereof.

The optional wetting agent enhances the spread of the ink on the substrate. Examples of types of wetting agents that may be used include silicone polyether acrylates, polyamine amides, and polyesters. An example of a wetting agent that may be used is TEGO® Rad 2200 N. The ink may comprise between about 0 wt % and about 0.5 wt % of the wetting agent.

The optional adhesion promoter enhances the adhesion of the ink to the substrate. The adhesion promoter may be a trifunctional acrylate ester, such as SR9012, available from Sartomer, or a trifunctional methacrylate ester, such as SR9008, also available from Sartomer. Other adhesion promoters that may be used include organic titanates and zirconates. The ink may comprise between about 1 wt % and about 5 wt % of the adhesion promoter.

The optional defoamer minimizes the presence or formation of bubbles in the ink. The defoamer may also function as an anti-foaming agent. The defoamer may be a silicone defoamer, such as a defoamer containing foam destroying polymers and polysiloxanes. An example of a silicone defoamer that may be used is BYK®-088, available from BYK-Chemie. The ink may comprise between about 0.1 wt % and about 4.0 wt %, preferably between 0.3 wt % and about 1.5 wt %, of the defoamer.

The optional anti-skinning agent prevents the formation of a skin on the ink during storage or use. The anti-skinning agent may be an anti-oxidant, such as a phenolic or oximic anti-oxidant or an anti-oxidant that is free of phenols and oximes, such as Ascinin® Anti Skin VP 0443. The ink may comprise between about 0.3% wt % and about 8 wt % of the anti-skinning agent.

In addition to the components described above, the ink may include one or more curing agents, such as a thermal initiator or a photo-initiator. A thermal initiator may be included in inks that are thermally cured, and a photo-initiator may be included in inks that are photochemically cured, such as by ultraviolet light. A curing agent may not be required, depending on the method that is used to cure the ink. For example, an ink that is electron beam cured may not require a separate initiator.

The ink may include between about 0.1 wt % and about 10 wt % of one or more thermal initiators. Examples of thermal initiators that may be used include organic peroxides, such as Luperox® 101 and Luperox® DI, available from Arkema. Other types of thermal initiators that may be used include persulfates, peresters, percarbonates, and azo initiators.

The ink may include between about 0.1 wt % and about 10 wt % of one or more photo-initiators. Examples of photo-initiators that may be used include propanone or phenylbis initiators, e.g., phenylbis(2,4,6-trimethylbenzoyl)-phosphine oxide. Examples of propanone or phenylbis initiators that may be used include Irgacure® 1171, Irgacure® 1173, Irgacure® 379, and Irgacure® 879, all of which are available from Ciba.

An example of an inkjet printing apparatus that may be used to deliver the blue inks provided according to embodiments of the invention is described below with respect to FIG. 3.

Figure 3:
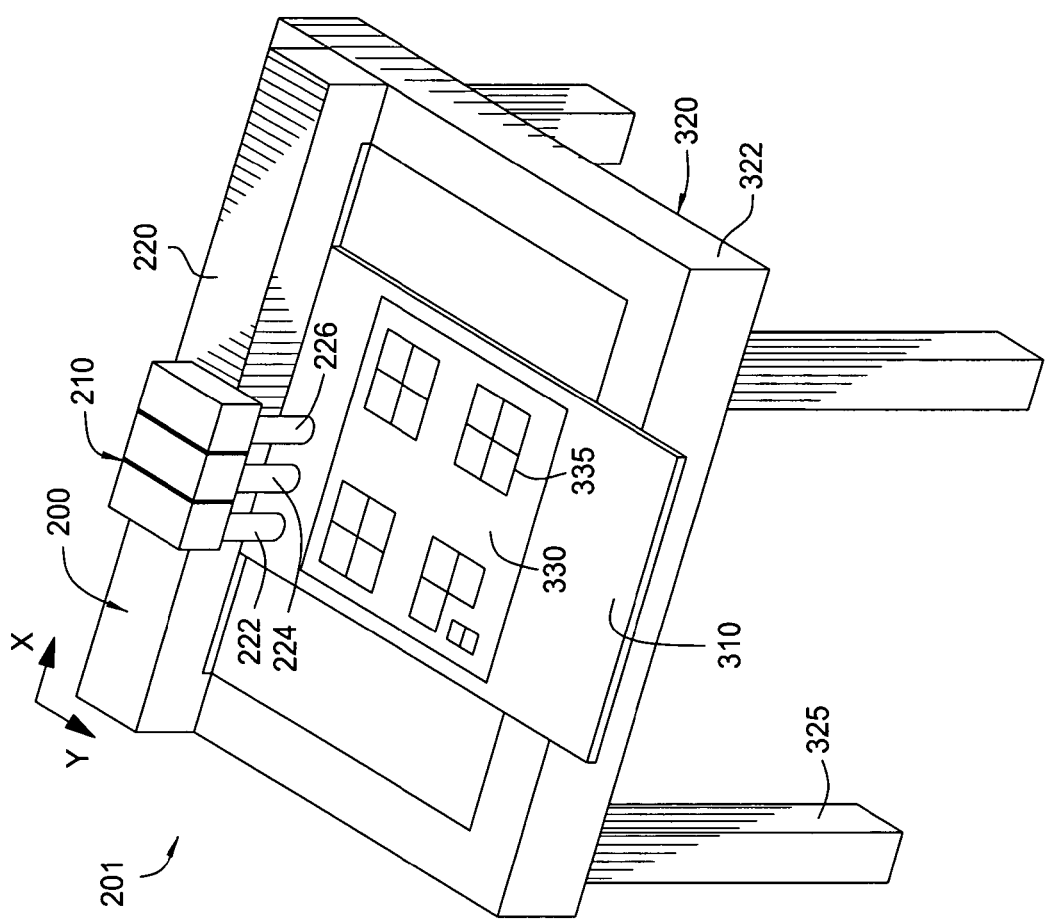
FIG. 3 is a perspective view of an exemplary inkjet printing apparatus that may be used according to embodiments of the invention.

FIG. 3 is a perspective view of an exemplary embodiment of an inkjet printing apparatus 201 to form color filters in flat panel displays of the present invention. FIG. 3 illustrates components of a stage positioning system 320 which includes a stage 310. In the embodiment shown in FIG. 3, the stage 310 moves in the Y direction and the inkjet heads 222, 224, and 226 of an inkjet printing module 210 move in the X direction. In other embodiments, the stage 310 could move in both X and Y directions. A stage moving device (not shown) with one or more motors could be used to move the stage 310 in the Y-axis direction. In an exemplary embodiment, the substrate stage 310 can also be rotatable by using an appropriate stage rotating device (not shown). The stage 310 can also be rotated so as to rotate and/or orient the substrate 330 for aligning the substrate 330 and the display object(s) contained thereon with an inkjet printing module 210 of a inkjet printing system 200, both of which are described below.

The stage 310 can be of any appropriate or suitable size to support a substrate or substrates which are to be processed. In an exemplary embodiment, the apparatus 201 and its component parts can, for example, process substrates having dimensions of, for example, 5500 cm$^2$ and above. The apparatus 201 and its component parts can be designed and adapted to process substrates having any size.

The apparatus 201 also include a stage positioning system 320 which supports the substrate stage 310 and which, in an exemplary embodiment, can include a top portion 322 and a plurality of legs 325. Each leg may include an air cylinder or other cushioning mechanism (not shown) to isolate the stage 310 from vibrations (e.g., from the floor on which the apparatus 201 rests). The stage positioning system 320 can also include a controller (not shown) for controlling the operation of the stage moving device (not shown). The substrate 330 shown in FIG. 3 can include any number of display objects 335.

FIG. 3 illustrates an inkjet printing module 210 of the inkjet printing system 200 and an inkjet printing module support 220 on which the inkjet printing module 210 is mounted. In an exemplary embodiment, the inkjet printing module 210 is moveable along the inkjet printing module support 220 by an inkjet positioning device (not shown). In the embodiment of FIG. 3, the inkjet printing module 210 includes three inkjet devices 222, 224 and 226. In an exemplary embodiment, each inkjet device 222, 224 and 226 can dispense a different color ink, for example red, green, blue, and optionally a clear ink, depending upon the color system being utilized. For example, a first inkjet device can dispense red ink, a second inkjet device can dispense green ink and a third inkjet device can dispense blue ink. In another exemplary embodiment, any one or more of the inkjet devices can dispense the same color ink or a clear ink. Although described as being equipped with three inkjets devices, the inkjet printing module 210 and the apparatus 201 of the present invention can utilize any number of inkjet devices depending upon the application or use of the apparatus 201.

In one embodiment of the invention, each of the inkjet devices 222, 224 and 226 can move independently of each other while printing. This may be advantageous when printing more than one panel on a substrate. Each of the inkjet devices 222, 224 and 226 can include an inkjet head (not shown), an isolated head interface board (not shown), a height adjustment device (not shown), a head rotation actuator device (not shown), and an ink reservoir (not shown). For example, each of the inkjet head, can be rotated by its respective head rotation actuator device. In this manner, the pitch or the angle at which an inkjet head is oriented relative to a display object on a substrate can be changed depending upon a printing application. Each inkjet head can have numerous nozzles.

The inkjet printing apparatus described above with respect to FIG. 3 is one example of an inkjet printing apparatus that may be used with embodiments of the invention. Another example of an inkjet printing apparatus that may be used is described in commonly assigned U.S. patent application Ser. No. 11/019,967 (APPM 9521), filed Dec. 22, 2004 and entitled "Apparatus and Methods for an Inkjet Head Support having an Inkjet Head Capable of Independent Lateral Movement," which is incorporated by reference herein.

After the blue ink is delivered onto the substrate by the inkjet printing apparatus, the blue ink is typically cured. In one embodiment, the blue ink further comprises a thermal initiator and is cured by heating the substrate at between about 120° C. and about 250° C. in a baking chamber for about 5 minutes to about 20 minutes. In another embodiment, the blue ink comprises a photo-initiator and is cured by exposing the substrate to UV radiation having a wavelength between about 254 nm and about 360 nm with a scanning speed between about 5 feet/min to about 25 feet/min.

The blue inks provided according to embodiments of the invention for producing displays by inkjetting are physically and chemically stable during inkjetting and can be stored at ambient conditions. The blue inks have a color chromaticity and a high color transparency that are desirable for both computer and television displays.

While the blue inks provided herein have been described primarily with respect to color filters for LCDs, the blue inks provided herein may also be used for organic light-emitting diode (OLED) displays. For example, the blue inks may be used to filter color in an OLED display that contains white light-emitting diodes.

The following non-limiting example is provided to further illustrate the embodiments of the invention. However, the example is not intended to be all inclusive and is not intended to limit the scope of the invention described herein.

EXAMPLE

A blue ink for a color filter of a flat panel display was formed by mixing the following ingredients to form an ink having the following wt % of the ingredients: 5.8 wt % Irgacure® 1171 (photo-initiator), 0.7 wt % Irgacure® 379 (photo-initiator), 7.6 wt % SR 238 (monomer), 7.6 wt % DPHA (monomer), 2.4 wt % Capmul® GMO-50 (polymeric dispersant), 12.2 wt % Fastogen Blue EP7S, 2.3 wt % Hostaperm Violet P-RL, 0.4 wt % TEGO® Rad 2200 N (wetting agent), 0.48 wt % BYK-088 (defoamer), 2.9 wt % SR9008 (adhesion promoter), 36.6 wt % MPA (solvent), 12.2 wt % propyleneglycol diacetate (solvent), 8.4 wt % Solsperse 34750 (polymeric dispersant), and 1.05 wt % Solsperse 5000 (polymeric dispersant). The blue ink was delivered to a substrate for a flat panel display using an inkjet printing apparatus. The blue ink was then cured by a UV irradiation system. The blue ink had a x=0.1427, y=0.0897 and Y=8.415 as measured by a spectrophotomer.

While the foregoing is directed to embodiments of the present invention, other and further embodiments of the invention may be devised without departing from the basic scope thereof, and the scope thereof is determined by the claims that follow.

What is claimed is:

1. A blue ink comprising:
   one or more blue organic pigments;
   one or more monomers;
   one or more polymeric dispersants; and
   one or more organic solvents, wherein the blue ink has a chromaticity of x=0.130, y=0.070, Y=6.00 to x=0.148, y=0.100, Y=9.80.

2. A blue ink comprising:
   one or more blue organic pigments selected from the group consisting of PB 15:6 pigments;
   one or more monomers selected from the group consisting of diacrylate esters, acrylic esters, dipentaerythritol pentaacrylates, and combinations thereof;
   one or more polymeric dispersants selected from the group consisting of polymeric amides, polyesters, polyacrylic acid polymers, acrylic acid/maleic acid copolymers, or combinations thereof;
   one or more organic solvents selected from the group consisting of acetates, alcohols, propionates, ketones, and combinations thereof;
   a wetting agent selected from the group consisting of silicone polyether acrylates, polyamine amides, and polyesters;
   an adhesion promoter selected from the group consisting of trifunctional acrylate esters, trifunctional methacrylate esters, organic titanates, and zirconates;
   a defoamer selected from the group consisting of foam destroying polymers and polysiloxanes; and
   an anti-skinning agent selected from the group consisting of phenolic anti-oxidants, oximic anti-oxidants, anti-oxidants that are free of phenols and oximes, and combinations thereof.

3. A blue ink comprising:
   one or more blue organic pigments;
   one or more violet pigments, wherein the ratio of the total wt % of the one or more blue organic pigments to the total wt % of the one or more violet organic pigments is between about 30:1 and about 10:1;
   one or more monomers;
   one or more polymeric dispersants;
   one or more organic solvents; and
   one or more additives selected from the group consisting of a wetting agent, an adhesion promoter, a defoamer, an anti-skinning agent, and combinations thereof, wherein the blue ink has a chromaticity of x=0.130, y=0.070, Y=6.00 to x=0.148, y=0.100, Y=9.80.

4. The blue ink of claim 3, wherein the total wt % of the one or more blue organic pigments and the one or more violet pigments is between about 5 wt % and about 30 wt %, and the blue ink comprises between about 5 wt % and about 30 wt % of the one or more monomers, between about 5 wt % and about 15 wt % of the one or more polymeric dispersants, and between about 40 wt % and about 70 wt % of the one or more organic solvents.

5. The blue ink of claim 4, wherein the blue ink further comprises between about 1 wt % and about 15 wt % of one or more oligomers.

6. A blue ink comprising:
   one or more blue organic pigments;
   one or more violet pigments, wherein the ratio of the total wt % of the one or more blue organic pigments to the total wt % of the one or more violet organic pigments is between about 30:1 and about 10:1;
   one or more monomers;
   one or more polymeric dispersants;
   one or more organic solvents; and
   one or more additives selected from the group consisting of a wetting agent, an adhesion promoter, a defoamer, an anti-skinning agent, and combinations thereof, wherein the blue ink comprises about 12 wt % blue organic pigments, about 0.9 wt % violet pigments, about 18 wt % monomers, about 9.5 wt % polymeric dispersants, about 49 wt % organic solvents, about 0.4 wt % wetting agent, about 3 wt % adhesion promoter, about 0.5 wt % defoamer, and about 6.5 wt % photo-initiators.

7. A method of forming a display, comprising:
   dispensing a blue ink onto a substrate with an inkjet printing apparatus, wherein the blue ink comprises:
   one or more blue organic pigments;
   one or more monomers;
   one or more polymeric dispersants; and
   one or more organic solvents, wherein the blue ink has a chromaticity of x=0.130, y=0.070, Y=6.00 to x=0.148, y=0.100, Y=9.80.

8. The method of claim 7, wherein the blue ink further comprises one or more violet pigments.

9. The method of claim 8, wherein the ratio of the total wt % of the one or more blue organic pigments to the total wt % of the one or more violet pigments is between about 30:1 and 10:1, and the blue ink further comprises one or more additives selected from the group consisting of a wetting agent, an adhesion promoter, a defoamer, an anti-scratch agent, and combinations thereof.

10. The method of claim 7, wherein the one or more blue organic pigments are selected from the group consisting of PB 15:6 pigments, the one or more monomers are selected from the group consisting of diacrylate esters, acrylic esters, dipentaerythritol pentaacrylates, and combinations thereof, the one or more polymeric dispersants are selected from the group consisting of polymeric amides, polyesters, polyacrylic acid polymers, acrylic acid/maleic acid copolymers, and combinations thereof, and the one or more organic solvents are selected from the group consisting of acetates, propionates, alcohols, ketones, and combinations thereof.

11. A method of forming a display, comprising:
dispensing a blue ink onto a substrate with an inkjet printing apparatus, wherein the blue ink comprises:
one or more blue organic pigments selected from the group consisting of PB 15:6 pigments;
one or more monomers selected from the group consisting of diacrylate esters, acrylic esters, dipentaerythritol pentaacrylates, and combinations thereof;
one or more polymeric dispersants selected from the group consisting of polymeric amides, polyesters, polyacrylic acid polymers, acrylic acid/maleic acid copolymers, and combinations thereof;
one or more organic solvents selected from the group consisting of acetates, propionates, alcohols, ketones, and combinations thereof,
one or more oligomers selected from the group consisting of aromatic monoacrylate oligomers, aliphatic diacrylate oligomers, aliphatic triacrylate oligomers, polyester acrylates, and combinations thereof;
a wetting agent selected from the group consisting of silicone polyether acrylates, polyamine amides, and polyesters;
an adhesion promoter selected from the group consisting of trifunctional acrylate esters, trifunctional methacrylate esters, organic titanates and zirconates
a defoamer selected from the group consisting of foam destroying polymers and polysiloxanes; and
an anti-skinning agent selected from the group consisting of phenolic anti-oxidants, oximic anti-oxidants, anti-oxidants that are free of phenols and oximes, and combinations thereof.

12. A method of forming a display, comprising:
dispensing a blue ink onto a substrate with an inkjet printing apparatus, wherein the blue ink comprises:
one or more blue organic pigments;
one or more monomers;
one or more polymeric dispersants; and
one or more organic solvents, wherein the blue ink comprises about 12 wt % blue organic pigments, about 0.9 wt % violet pigments, about 18 wt % monomers, about 9.5 wt % polymeric dispersants, about 49 wt % organic solvents, about 0.4 wt % wetting agent, about 3 wt % adhesion promoter, about 0.5 wt % defoamer, and about 6.5 wt % photo-initiators.

13. The method of claim 7, further comprising curing the blue ink after it is dispensed onto the substrate.

14. A display, produced by a process comprising:
dispensing a blue ink onto a substrate with an inkjet printing apparatus, wherein the blue ink comprises:
one or more blue organic pigments;
one or more monomers;
one or more polymeric dispersants; and
one or more organic solvents, wherein the blue ink has a chromaticity of x=0.130, y=0.070, Y=6.00 to x=0.148, y=0.100, Y=9.80.

15. The display of claim 14, wherein the blue ink further comprises one or more violet pigments.

16. The display of claim 15, wherein the ratio of the total wt % of the one or more blue organic pigments to the total wt % of the one or more violet organic pigments is between about 30:1 and about 10:1, and the blue ink further comprises one or more oligomers and one or more additives selected from the group consisting of a wetting agent, an adhesion promoter, a defoamer, an anti-skinning agent, and combinations thereof.

17. The blue ink of claim 1, further comprising one or more violet pigments.

18. The blue ink of claim 1, wherein the blue ink has a viscosity of between about 5 cPs and about 20 cPs at 20° C. and a surface tension between about 22 mN/m and about 35 mN/m at 20° C.

19. The blue ink of claim 1, further comprising one or more oligomers.

20. The blue ink of claim 19, wherein the one or more oligoiners are selected from the group consisting of aromatic monoacrylate oligomers, aliphatic diacrylate oligomers, aliphatic triacrylate oligomers, polyester acrylates, and combinations thereof.

21. The blue ink of claim 1, further comprising a wetting agent, an adhesion promoter, a defoamer, or an anti-skinning agent.

22. The blue ink of claim 1, wherein the one or more blue organic pigments are selected from the group consisting of PB 15:6 pigments, the one or more monomers are selected from the group consisting of diacrylate esters, acrylic esters, dipentaerythritol pentaacrylates, and combinations thereof, the one or more polymeric dispersants are selected from the group consisting of polymeric amides, polyesters, polyacrylic acid polymers, acrylic acid/maleic acid copolymers, or combinations thereof, and the one or more organic solvents are selected from the group consisting of acetates, alcohols, propionates, ketones, and combinations thereof.

* * * * *

UNITED STATES PATENT AND TRADEMARK OFFICE
CERTIFICATE OF CORRECTION

PATENT NO. : 7,544,723 B2  Page 1 of 1
APPLICATION NO. : 11/182491
DATED : June 9, 2009
INVENTOR(S) : Sun et al.

It is certified that error appears in the above-identified patent and that said Letters Patent is hereby corrected as shown below:

Column 3, Line 66, please delete "pigmen(s)" and insert --pigment(s)-- therefor;

Column 10, Claim 20, Line 38, please delete "oligoiners" and insert --oligomers-- therefor.

Signed and Sealed this

Eighteenth Day of August, 2009

David J. Kappos
*Director of the United States Patent and Trademark Office*